United States Patent [19]

Mizutome et al.

[11] Patent Number: 4,581,619
[45] Date of Patent: Apr. 8, 1986

[54] IMAGE FORMING APPARATUS

[75] Inventors: Atsushi Mizutome, Hayamamachi; Hiroshi Inoue, Kawasaki; Akio Yoshida, Kanagawa; Satoshi Yoshihara, Kawasaki, all of Japan

[73] Assignee: Canon Kabushiki Kaisha, Tokyo, Japan

[21] Appl. No.: 722,398

[22] Filed: Apr. 12, 1985

[30] Foreign Application Priority Data

Apr. 26, 1984 [JP] Japan .................. 59-84619

[51] Int. Cl.[4] .............................. G02F 1/03
[52] U.S. Cl. ................... 346/160; 350/356
[58] Field of Search ............ 346/153.11, 155, 160, 346/762, 108; 350/355–356; 355/84; 400/119; 101/DIG. 13; 358/302, 295

[56] References Cited

U.S. PATENT DOCUMENTS

4,391,490 7/1983 Hartke .................. 350/358
4,458,989 7/1984 Tschang ................. 346/160

Primary Examiner—E. A. Goldberg
Assistant Examiner—A. Evans
Attorney, Agent, or Firm—Fitzpatrick, Cella, Harper & Scinto

[57] ABSTRACT

An image forming apparatus comprises an exposure light source, an image bearing member and a printer head interposed therebetween. The printer head has a micro-shutter array which comprises a plurality of micro-shutters arranged in a matrix comprising a plurality of rows and a plurality of columns. Each micro-shutter comprises a first electrode connected to a terminal of a thin film transistor, a second electrode forming a common electrode and a liquid crystal interposed therebetween. On the first electrode is further provided an opposing conductor film through an insulating film, whereby a charge storage capacitor is formed. Because of the charge storage capacitor, an effective voltage applied across the liquid crystal is kept at a high level, whereby an optical signal with good contrast is given to the image bearing member even when the printer head is driven according to a high degree of time-division scheme.

15 Claims, 11 Drawing Figures

IMAGE FORMING APPARATUS

BACKGROUND OF THE INVENTION

The present invention relates to an image forming apparatus comprising a liquid crystal shutter array which is driven by thin film transistors and which can ensure a sharp contrast even with an increased number of shutter apertures and with an increased number of time-division.

Various attempts have been made in order to apply a liquid crystal shutter array having an array of a plurality of shutter apertures composed of a liquid crystal to an electrophotographic printer head or the like. When a liquid crystal shutter array is used as an electrophotographic printer head, a plurality of fine apertures are arranged in one or more rows and a light beam emitted from an exposure light source is projected onto the rear side of the liquid crystal shutter array. Each shutter is opened (to permit the transmission of light) or closed (to prevent the transmission of light) by turning on or off a voltage applied across a liquid crystal, and extremely small spots of light transmitted through the shutters are combined to form an image or pattern.

In the conventional liquid crystal shutter arrays, a number (n) of scanning electrodes and a number (m) of signal electrodes are arranged in a matrix array and a large number of picture elements are constituted by liquid crystals which are capacitor-type load elements. In order to drive a liquid crystal shutter array of the type described, address signals are selectively, sequentially and periodically applied to respective scanning electrodes and, in synchronism with the address signals, predetermined information signals are selectively applied to the signal electrodes in parallel. According to such a time-division or time-sharing driving system as described above, as the number of time-division is increased, the ratio $V_{ON}$ (ON signal)/$V_{OFF}$ (OFF signal) approaches 1 (unity) as shown by the below equation so that the opening-closing efficiency of a liquid crystal element constituting a picture element is degraded. As a result, especially in the case of a liquid crystal shutter array, an optical signal with a sufficient S/N (signal-to-noise) ratio can not be applied. Therefore, there has been a defect that when such a conventional liquid crystal shutter array is used as an image exposure unit (printer head) of an electrophotographic printer, high-quality images cannot be obtained.

$$V_{ON}/V_{OFF} = \frac{(V_0/a)\ [a^2 + N - 10/N]^{\frac{1}{2}}}{(V_0/a)\ [(a-2)^2 + N - 1/N]^{\frac{1}{2}}}$$

where
1/N: the duty ratio
1/a: the bias ratio; and
$V_0$: the voltage applied.

In a liquid crystal shutter array in which such shutters as described above are arranged in an array consisting of a plurality of rows and a plurality of columns, these shutters are sequentially driven by a time-division driving scheme, but when the number of time-division is increased, the contrast at each shutter is degraded so that only a low-quality image is obtained. This is considered to be because an effective voltage applied across a liquid crystal layer drops with increase in number of time-division.

SUMMARY OF THE INVENTION

In view of the above, a primary object of the present invention is to provide an image forming apparatus with a liquid crystal shutter array which is driven by thin film transistors and which can ensure a sharp contrast even when the number of shutter apertures is increased and the number of time division is increased.

The above object of the present invention can be attained by providing a thin film transistor (TFT) and an additional charge storage capacitor for each shutter aperture so that the effective voltage applied across a liquid crystal layer can be maintained at a high level.

Briefly stated, the present invention provides an improvement in an image forming apparatus of the type comprising an exposrue light source, a printer head provided with a micro-shutter array which is disposed in the exposure light path from the exposure light source and comprises a plurality of micro-shutters each controlling the transmission or interruption of light therethrough, and an image bearing member so disposed to be irradiated with the light signal transmitted through the printer head. Thus, the plurality of micro-shutters of the micro-shutter array are arranged in a matrix comprising a plurality of rows and a plurality of columns, each of the micro-shutters comprises a first electrode connected to a terminal of a thin film transistor, a second electrode which serves as a common electrode and a liquid crystal interposed between the first and second electrode, and the first electrode is further provided with a conductor film in opposed relationship through an intermediate insulating film, the first electrode, the intermediate insulating film and the conductor film forming in combination a charge storage capacitor.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2A-2C show a time chart for driving a liquid crystal array, FIGS. 2A-2E showing input signal waveforms applied to the gate and source of a thin film transistor and a counter electrode, respectively, FIG. 2D showing an effective voltage waveform applied to a shutter aperture $W_0$, and FIG. 2E showing a bright level and a dark level of a shutter;

DESCRIPTION OF THE PREFERRED EMBODIMENTS

So far, the essential features of the present invention has been briefly described. In order to clarify the nature of the present invention, the outline of our studies and analyses of the problems encountered in the conventional image forming devices will be described and especially the influence of a charge storage capacitor on the characteristics of a liquid crystal element will be described in rather detail hereinbelow.

Figure 1:
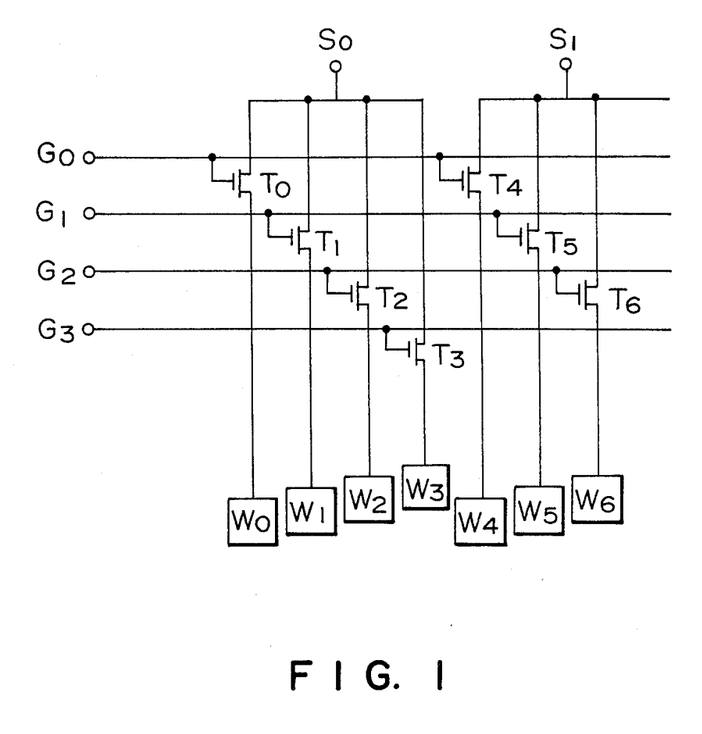
FIG. 1 is a driving circuit diagram illustrating a relationship between thin film transistors and shutter apertures of a liquid crystal shutter array.

FIG. 1 is a driving circuit diagram which shows a relative arrangement of a plurality of thin film transistors and shutter apertures in a liquid crystal shutter array. In FIG. 1, $T_0$, $T_1$ ... designate thin film transistors whose gate electrodes are connected to gate signal input terminals $G_0$–$G_3$, respectively. The source electrodes of four thin film transistors constituting one group are connected to data signal input terminals $S_0$, $S_1$ and so on, respectively. FIG. 1 shows a 4-time division system capable of sequentially handling four sets of different signals, but it is to be understood that the present invention is not limited thereto. The drain electrodes are connected to the segment electrodes, respectively, of shutter apertures $W_0$, $W_1$, $W_2$ and so on so as to deliver data for turning ON or OFF the shutters.

The system shown in FIG. 1 is driven in accordance with, for example, a time chart as shown in FIGS. 2A–2E.

Figure 2A:
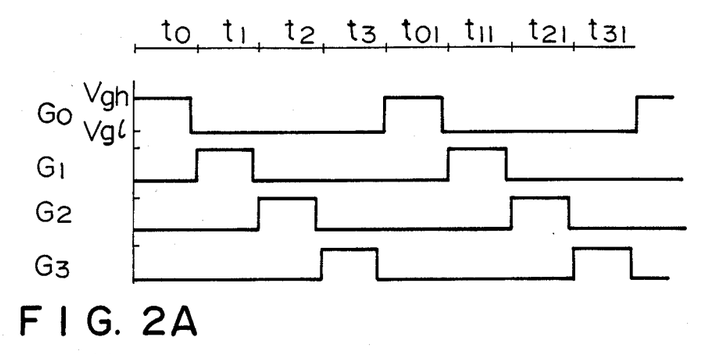

FIG. 2A shows voltage waveforms applied to the gate signal input terminals $G_0$–$G_3$. When the potential rises to Vgh, the corresponding thin film transistor is turned ON so that the channel between the drain and source is conducted. On the other hand, when the potential drops to Vgl, the corresponding thin film transistor is turned OFF and is driven into the electrically nonconductive state.

Figure 2B:
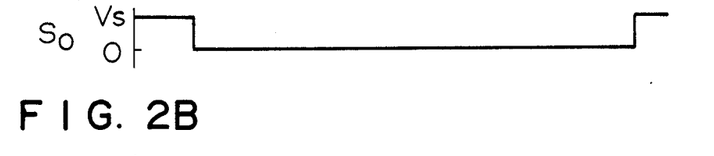
Figure 2C:
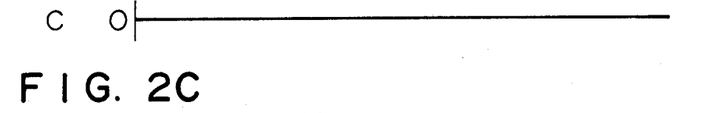

FIG. 2B shows a voltage waveform applied to the data signal input terminal $S_0$ and FIG. 2C shows a voltage waveform applied to a counter electrode and is kept at a grounded level in this embodiment.

Now, the shutter aperture $W_0$ is to be noted. At a time $t_0$, the potential of the gate electrode of the thin film transistor $T_0$ which drives the shutter aperture $W_0$ is Vgh so that the thin film transistor $T_0$ is in the conductive state at $t_0$. At this time, the potential at the data input signal terminal $S_0$ connected to the source electrode of $T_0$ is Vs so that a voltage Vd ($\simeq$Vs) is applied across a liquid crystal of the shutter aperture $W_0$. At $t_1$, the potential of the gate electrode of the thin film transistor $T_0$ is Vgh so that the thin film transistor $T_1$ is driven into the nonconductive state. As a result, in an ideal case, the potential applied to the liquid crystal of the shutter aperture $W_0$ immediately before is retained.

Figure 2D:
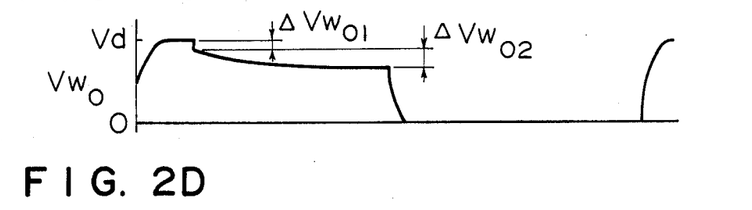

However, in practice, as shown in FIG. 2D, voltage drops $\Delta V_{w01}$ and $\Delta V_{w02}$ occur. The voltage drop $\Delta V_{w01}$ is caused by the existence of a capacitance Cgd due to the overlapping between the gate electrode and the drain electrode of the thin film transistor.

Figure 2E:
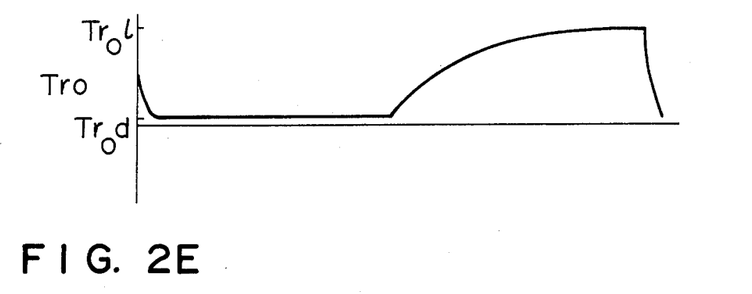

FIG. 2E shows the light transmission state and the light interruption state in time series when the voltage waveform as shown in FIG. 2D is applied across the liquid crystal of the shutter aperture $W_0$. More particularly, during a time interval from $t_0$ to $t_3$, the transmissivity of the shutter aperture $W_0$ is at a dark level $Tr_0d$ while, during a time interval from $T_{01}$ to $t_{31}$, the transmissivity of the shutter aperture $W_0$ is at a transparent level $Tr_0l$.

The voltage drop $\Delta V_{w01}$ is expressed by the following equation.

$$\Delta V_{w01} = [Cgd/(Cgd + Ccell)] \times \Delta Vg \tag{1}$$

where
$\Delta Vg$: the range of variation in gate voltage;
Ccell: the capacitance of the liquid crystal layer;

$$1/Ccell = 1/Ci_1 + 1/C_{LC} + 1/Ci_2 \tag{2}$$

The voltage drop $\Delta V_{w02}$ is caused by the discharge of charge from the liquid crystal layer and the $\tau$ thereof is given by:

$$\tau = C_{LC} / \left[ \frac{1}{R_{off}} (1 + C_{LC}/Ci) + 1/R_{LC} \right] \tag{3}$$

where
Roff: the resistance when the thin film transistor is OFF;
$R_{LC}$: the resistance of the liquid crystal layer; and
Ci: the combined capacitance of $Ci_1$ and $Ci_2$.

The effective voltage applied to the liquid crystal corresponds to the area defined by the voltage waveform shown in FIG. 2C and $V_{w0}=0$. It follows therefore that when the voltage drops $\Delta V_{w01}$ and $\Delta V_{w02}$ occur as shown in FIG. 2D, the effective voltage drops. In the liquid crystal shutter array, upon application of an electric field to a liquid crystal layer, a shutter is closed and the dark level is in portion to the effective voltage applied to the liquid crystal layer. Therefore, the above-described drop off effective value means degradation of the dark level and consequently results in poor contrast. In view of the above, the voltage drops $\Delta V_{w01}$ and $\Delta V_{w02}$ which cause the drop of the effective voltage applied to the liquid crystal must be suppressed as small as possible.

From Eqs. (1), (3) and (4), it is apparent that in order to minimize the voltage drops $\Delta V_{w01}$ and $\Delta V_{w02}$ the value of Roff or the value of Ccell must be increased.

In the case of the liquid crystal panel, it is seen that the value of Ccell, which is defined by Eq. (2), must be increased in Eq. (1) in order to minimize the voltage drops $\Delta V_{w01}$ and $\Delta V_{w02}$, thereby increasing the effective voltage applied to the liquid crystal. Since Ccell is mainly given by $C_{LC}$, the object to raise the effective voltage can be partially attained by increasing the value of $C_{LC}$ including that in Eq. (3). However, the value of $C_{LC}$ is inevitably determined depending upon various characteristics (driving conditions, an operating temperature range, etc.) of a liquid crystal used. Furthermore, the maximum dielectric constant in terms of $\epsilon_\parallel$ of a liquid crystal which determines the value of $C_{LC}$ is of the order of 30 and therefore the increase thereof is limited. As a consequence, when thin film transistors are used for driving and when the number of time division is increased, a sufficiently high effective voltage can not be attained only by the capacitance of $C_{LC}$ of a liquid crystal.

According to the present invention, as described hereinbefore, a charge storage capacitor is connected to the segment electrode connected to the drain electrode of a thin film transistor which applies a voltage to a liquid crystal so that the capacitance of a liquid crystal layer is increased as a whole. Therefore, even when the number of time division is increased, the effective voltage applied to a liquid crystal can be prevented from dropping.

Figure 3:
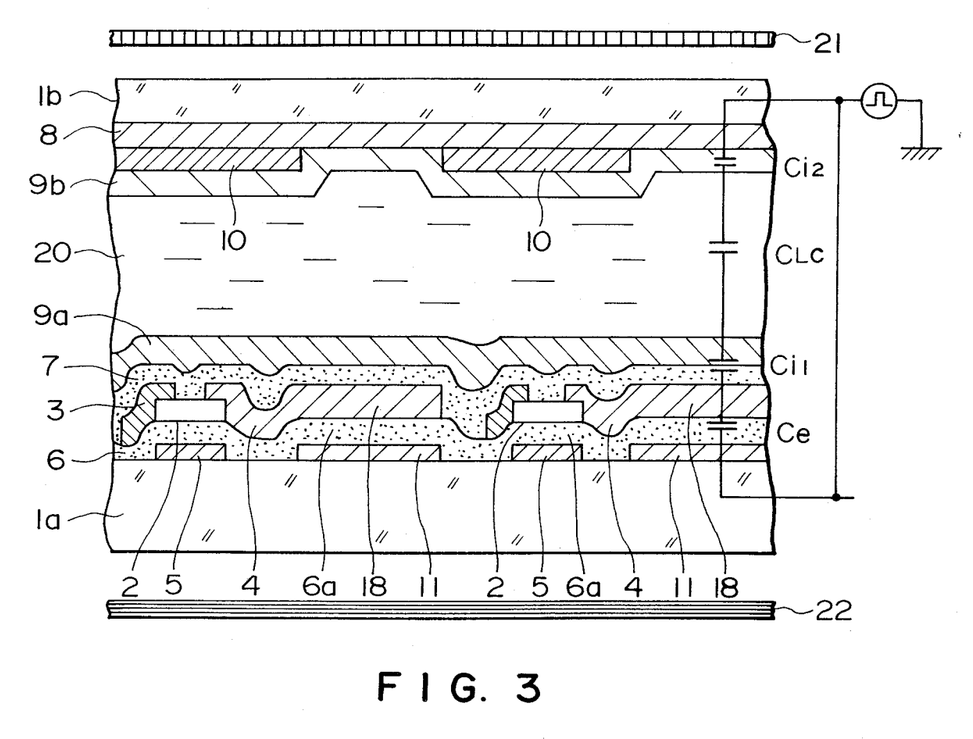
FIG. 3 shows a sectional view and an equivalent circuit diagram in combination of one shutter aperture of a liquid crystal shutter array provided with charge storage capacitors in accordance with the present invention.

FIG. 3 is a sectional view of one shutter portion of a liquid crystal shutter array in accordance with the present invention together with an equivalent circuit thereof. One shutter portion of the liquid crystal shutter array comprises a shutter aperture and a thin film transistor (TFT) portion located adjacent to the shutter aperture. One shutter portion comprises a pair of transparent base plates 1a and 1b and a thin film transistor (TFT) comprising a semiconductor layer 2 (e.g., amorphous silicon or tellurium), a source electrode 3, a drain electrode 4, a gate electrode 5, a gate insulating layer or film 6 and a protective layer 7 is formed on the base plate 1a. Furthermore, a transparent segment electrode 18 which is connected to the drain electrode 4 of the thin film transistor is formed on the base plate 1a of the shutter aperture and the protective layer 7 cover the transparent segment electrode 18. Moreover, an orientation film 9a is formed on the base plate 1 to continuously cover the thin film transistors and the transparent electrodes at respective shutter apertures. On the other hand, a uniform transparent electrode 8, a light shielding film 10 which also serves as a common or counter electrode and is made of, e.g., Al-Cr and a uniform orientation film 9b are formed in the order named on the opposing base plate 1b. A P-type liquid crystal 20 (a nematic liquid crystal having a positive dielectric anisotropy) is interposed between the orientation films 9a and 9b.

In the case of a practical liquid crystal array, a pair of polarizers 21 and 22 are disposed above and below the base plates 1b and 1a, respectively, in a cross-nicol relationship as shown in FIG. 3 and the orientation films 9a and 9b are horizontally oriented in a direction forming an angle of 45° relative to the axes of polarization of the upper and lower polarizers. Therefore, when an electric field is applied to the liquid crystal layer 20, the shutter is closed, but when the electric field is removed, the shutter is opened.

Formed on the base plate 1a of the shutter aperture are a transparent conduction film 11 which is made of ITO and serves as another electrode of the above-described charge storage capacitor, a dielectric layer 6a which is an extension of the gate insulating film 6, and a transparent segment electrode 18 of ITO (indium-tin-oxide) etc., connected to the drain electrode 4 of the thin film transistor. The transparent conductor film 11, the dielectric layer 16 and the transparent segment electrode 18 in combination constitute the charge storage capacitor in accordance with the present invention. The transparent electrode 18 is further covered with the insulating film 7 and the orientation film 9a extended from the thin film transistor portion.

Next, the mode of operation of the liquid crystal shutter with the above-described construction will be described.

When the thin film transistors are used to drive a liquid crystal shutter as described above, the voltage drops occur as shown in FIG. 2A–2E. The voltage drop is given by Eqs. (1) and (3). In order to minimize the voltage drop so that the effective voltage applied to the liquid crystal is increased, the value of Ccell must be increased when considered from the side of the liquid crystal panel. According to the present invention, the charge storage capacitor Ce is provided so that the value of Ccell is given by:

$$Ccell = [1/(1/C_{i1} + 1/C_{LC} + 1/C_{i2})] + Ce.$$

The capacitance (Ccell) of one shutter aperture (area = 50×200 μm) in a liquid crystal shutter array without charge storage capacitors is obtained in the following manner under the conditions that the gate insulating film 6 and the protective film 7 consist of silicon nitride doped with hydrogen atoms SiN:H (dielectric constant: about 6.6); their thicknesses are 3000 Å and 2000 Å, respectively; the orientation film 9a consists of an organic orientation film (dielectric constant: about 3) and is 1000 Å in thickness; a liquid crystal used has a dielectric constant $\epsilon_\parallel$ of about 30 which is the maximum available at present; and a liquid crystal layer is 10 μm in thickness. Thus, the following values are obtained: $C_{i10} = 0.81$ (pF), $C_{i20} = 2.66$ (pF), and $C_{LC0} = 0.26$ (pF). Hence, Ccell (b) = 0.19 (pF).

On the other hand, in the case of the shutter aperture of the type shown in FIG. 3 in accordance with the present invention (in which the capacitor Ce same in size with the shutter aperture is formed under the shutter aperture), the capacitance (Ccell (a)) per unit area of one shutter aperture is calculated as follows: $C_{i1} = 1.39$ (pF), $C_{i2} = 2.66$ (pF), $C_{LC} = 0.26$ (pf), and $Ce = 1.95$ (pF). Hence, Ccell (a) = 2.15 (pF).

It is seen therefore that the capacitance Ccell (a) is greater than the capacitance Ccell (b) of the conventional shutter aperture by more than one order of magnitude. As a result, the voltage drops $\Delta V_{w01}$ and $\Delta V_{w02}$ of a voltage applied across a liquid crystal become as follows:

$\Delta V_{w01}$

Figure 4:
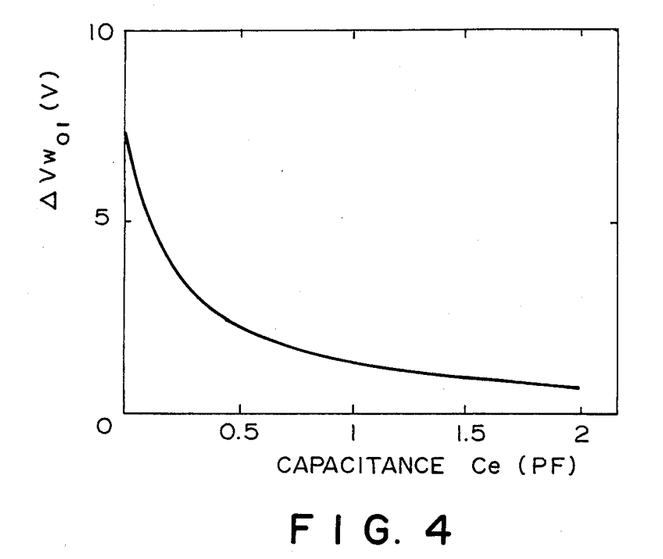
FIG. 4 shows a relationship between the capacitance of a charge storage capacitor and a voltage drop $\Delta V_{w01}$.

If the overlapping portion between the gate and drain of a thin film transistor is 1 μm, Cgd in Eq. (1) becomes $3.29 \times 10^{-2}$ (pF). Therefore, when $\Delta Vg = 50$ V (Vgh = 40 V and Vgl = −10 V), the voltage drop $\Delta V_{w01}$ (without a charge storage capacitor Ce) becomes 7.38 (V), but when a charge storage capacitor Ce same in size with a shutter aperture is formed under the shutter aperture, the voltage drop $\Delta V_{w01}$ (with Ce) becomes 0.75 (v). Thus, the voltage drop $\Delta V_{w01}$ has been reduced to a great extent. FIG. 4 shows the relationship between the capacitance of the charge storage capacitor Ce and the voltage drop $\Delta V_{w01}$.

$\Delta V_{w02}$

Figure 5:
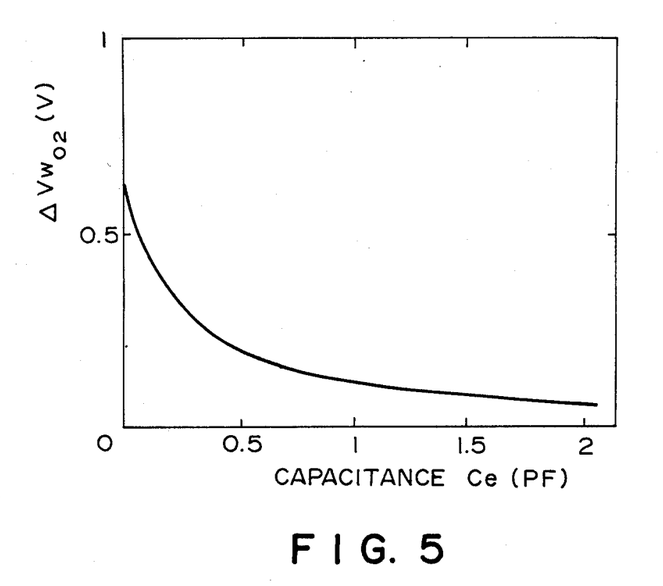
FIG. 5 shows a relationship between the capacitance of a charge storage capacitor and a voltage drop $\Delta V_{w02}$.

It is assumed that in Eq. (3) the magnitudes of Roff and $R_{LC}$ are $1 \times 10^{12}$ ohms and $1 \times 10^{11}$ ohms, respectively, and that an image with a picture element density of 16 dots/mm is displayed at a rate of 50 mm/sec. Then, the dots in one line are formed in 1.25 msec. Therefore, in the case of the four-channel time division system, $t_0$, $t_1$ and so on shown in FIG. 2 becomes ¼ of 1.25 msec., i.e., 0.3125 msec. Consequently, the voltage drop $\Delta V_{w02}$ occurs after ¾ of 1.25 msec (=0.9375 msec). FIG. 5 shows the relationship between the capacitance of the charge storage capacitance Ce and the voltage drop $\Delta V_{w02}$ after 0.9375 msec.

In FIG. 3, the charge storage capacitor same in size with the shutter aperture is shown as being formed under the electrode forming a shutter aperture, but it is to be understood that the conductor film functioning as an opposite electrode of the capacitor may be formed over the whole surface of the base plate.

Figure 6:
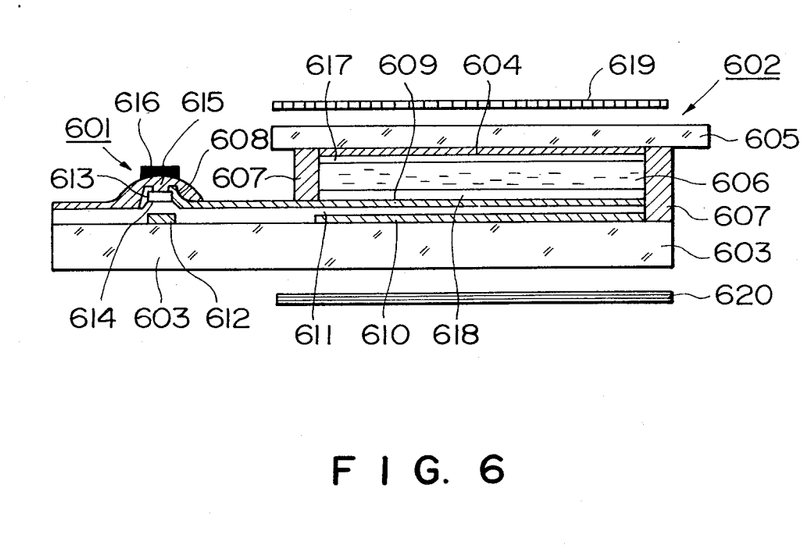
FIG. 6 is a sectional view of another embodiment of a liquid crystal shutter array used in the present invention.

FIG. 6 is a schematic sectional view of another type of liquid crystal shutter array used in the present invention. In this liquid crystal shutter array, a thin film transistor (TFT) portion 601 is formed on a base plate 603, which is also used as a base plate of a liquid crystal element 602, and outside the liquid crystal element 602. Especially it is preferred that the thin film transistor portion 601 is disposed outside of a sealing member 607 of, e.g., an epoxy adhesive, which seals a liquid crystal 606 between the base plate 603 of the liquid crystal element 602 and its opposing base plate 605 with a common or counter electrode 604. Alternatively, it may be possible to dispose the thin film transistor portion 601 on an exterior circuit board such as an integrated circuit board (not shown) instead of forming it on the base plate 603. In the embodiment as shown in FIG. 6, a transparent conductor film 610, a dielectric film 611 extended from the gate insulating film and a transparent segment electrode 609 of the shutter aperture connected to the drain 608 in combination constitute a charge storage capacitor. The thin film transistor 601 can be driven in accordance with the time chart as shown in FIG. 2. More particularly, a gate-ON pulse is applied to a gate electrode 612 connected to a gate line so that the thin film transistor 601 is turned ON and in synchronism with this gate-ON signal, a data input signal is applied to a source electrode 613 connected to a source line so that an output signal is derived from the drain 608. When a semiconductor film 614 constituting the thin film transistor 601 comprises a photoconductive material such as amorphous silicon, erratic operations tend to occur very frequently. Therefore, it is preferred that an Al or Cr light-shielding film 616 is formed over an insulating film 615. In FIG. 6, reference numerals 617 and 618 denote orientation control films of polyimide or the like and 619 and 620 denote polarizers disposed in cross-nicol relationship.

Figure 7:
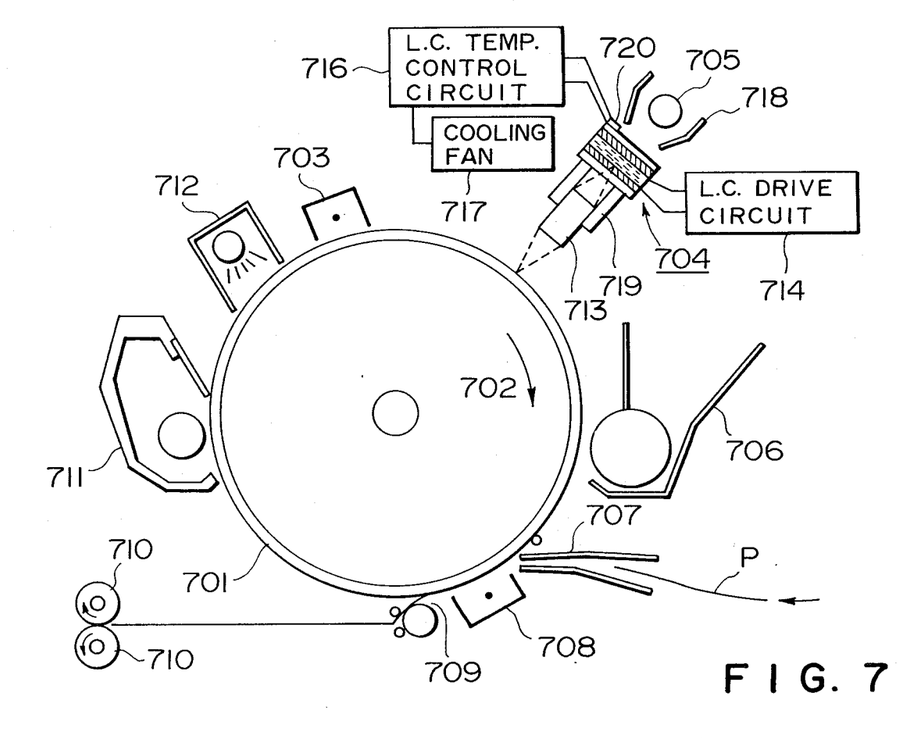
FIG. 7 is a schematic view of an image forming apparatus in accordance with the present invention.

FIG. 7 is a schematic view of a photoelectric printer incorporating the liquid crystal shutter array of the type described above. As a photosensitive drum 701 is rotated in the direction of an arrow 702, a charger 703 uniformly charges the cylindrical surface of the photosensitive drum 701 which is an image bearing member and a liquid crystal shutter array 704 is energized to selectively transmit and interrupt the light rays emitted from a light source 705 disposed behind the liquid crystal optical shutter array 404, thereby producing optical signals. The optical signals thus produced are focused upon the charged cylindrical surface of the photosensitive drum 701, whereby an electrostatic latent image is formed.

The electrostatic latent image thus produced is developed by a toner supplied from a developing device 706 and the toner image thus produced is transferred onto a copy paper (transfer paper) P by means of a transfer charger 708. The copy paper P now bearing the transferred toner image is gradually separated from the photosensitive drum 701 by means of a separation belt 709 and the toner image on the copy paper P is fixed by means of a fixing device 710. The toner which still remains on the cylindrical surface of the photosensitive drum 701 even after the toner image has been transferred onto the copy paper P in the manner described above is removed by a cleaning device 711. Thereafter, a pre-exposure device 712 discharges or removes charges on the cylindrical surface of the photosensitive drum 701 so that the next copy printing cycle may be started. The liquid crystal shutter array 704 shown in FIG. 7 is of the type shown in FIG. 2. That is, the light rays emitted from the light source 705 are focused through the liquid crystal shutter array 407 with liquid crystal cells and a lens array 713 such as Selfoc lens on the cylindrical surface of the photosensitive drum 701. In this case, a liquid crystal driving circuit 714 is activated or driven in response to the digital signals which are derived from an original reader (not shown) and which obtain image information so that the liquid crystal shutter array is turned ON or OFF, whereby the optical signal representative of a pattern of image information is focused on the cylindrical surface of the photosensitive drum 701. It is to be noted that, in this embodiment, the light source 705 also has a function of heating the liquid crystal cell 704 and a liquid-crystal-temperature control circuit 716 connected to a thermal sensor 720 drives a cooling fan 717 to prevent the overheating of the liquid crystal cell and to maintain it at a constant temperature. In FIG. 7, reference numeral 718 designates a reflector; and 719, a mounting member for mounting the lens array 713 on the liquid crystal shutter array assembly.

As described above, according to the present invention, thin film transistors are used to drive a liquid crystal shutter, wherein a charge storage capacitor is disposed on a transparent electrode forming a shutter aperture connected to the drain electrode of a thin film transistor so that a voltage applied across a liquid crystal can be effectively maintained at a high level. Thus, the present invention can provide an image forming apparatus with a liquid crystal shutter array which can be driven by utilizing a high degree of time-division without causing the degradation of contrast when the shutter is opened or closed.

What is claimed is:
1. In an image forming apparatus comprising an exposure light source, a printer head provided with a microshutter array which is disposed in the exposure light path from said exposure light source and comprises a plurality of micro-shutters each controlling the transmission or interruption of light therethrough, and an image bearing member so disposed to be irradiated with the light signal transmitted through the printer head; the improvement wherein said plurality of micro-shutters of said microshutter array are arranged in a matrix comprising a plurality of rows and a plurality of columns;

each of said micro-shutters comprises a first electrode connected to a terminal of a thin film transistor, a second electrode which serves as a common electrode and a liquid crystal interposed between said first and second electrodes; and said first electrode is further provided with a conductor film in opposed relationship through an intermediate insulating film, said first electrode, intermediate insulating film and conductor film forming in combination a charge storage capacitor.

2. The image forming apparatus according to claim 1, wherein said conductor film formed as an opposing electrode of said charge storage capacitor is disposed on a base plate upon which is disposed said first electrode.

3. The image forming apparatus according to claim 1, wherein said conductor film as an oppositing electrode of said charge storage capacitor is formed without overlapping a gate electrode.

4. The image forming apparatus according to claim 3, wherein said conductor film is formed on each of said first electrode which serves as the other electrode of said charge storage capacitor.

5. The image forming apparatus according to claim 1, wherein said first electrode is connected to the drain terminal of the thin film transistor.

6. The image forming apparatus according to claim 1, wherein said thin film transistor is formed outside of a liquid crystal cell comprising the micro-shutters.

7. The image forming apparatus according to claim 1, wherein the source of said thin film transistor is connected to a data signal input terminal which in turn is connected in common to the sources of a plurality of thin film transistors.

8. The image forming apparatus according to claim 7, wherein gate signals are sequentially applied to the gates of said plurality of thin film transistors.

9. The image forming apparatus according to claim 1, wherein said thin film transistor has amorphous silicon as a semiconductor.

10. The image forming apparatus according to claim 1, wherein the dielectric constant $\epsilon_\parallel$ of said liquid crystal is 30 or below.

11. The image forming apparatus according to claim 11, wherein said liquid crystal is a nematic liquid crystal.

12. The image forming apparatus according to claim 1, which further comprises pre-charging means by which said image bearing member is pre-charged, so that the pre-charged image bearing member is exposed with the optical signal from said printer head to form an electrostatic image thereon, and developing means for developing the electrostatic image.

13. The image forming apparatus according to claim 12, in which said developing means is a means for developing the electrostatic image with toner to form a toner image.

14. The image forming apparatus according to claim 13, wherein further comprises transfer means for transferring the toner image onto a recording medium.

15. The image forming apparatus according to claim 1, wherein said image bearing member is a rotatable photosensitive drum.

* * * * *

UNITED STATES PATENT AND TRADEMARK OFFICE
CERTIFICATE OF CORRECTION

PATENT NO. : 4,581,619

DATED : April 8, 1986

INVENTOR(S) : ATSUSHI MIZUTOME, ET AL.

Page 1 of 2

It is certified that error appears in the above-identified patent and that said Letters Patent is hereby corrected as shown below:

COLUMN 2

Line 16, "exposrue" should read --exposure--.
Line 46, "2A-2C" should read --2A-2E--.
Line 47, "2A-2E" should read --2A-2C--.

COLUMN 3

Line 5, "has" should read --have--.
Line 11, "in rather" should read --rather in--.
Line 34, "conducted." should read --conductive.--.
Line 51, "Vgh" shold read --Vgl--.
Line 66, "$T_{01}$" should read --$t_{01}$--.

COLUMN 4

Line 31, "portion" should read --proportion--.
Line 33, "drop off" should read --drop of--.

COLUMN 6

Line 41, "0.75(v)." should read --0.75(V).--.

COLUMN 8

Line 5, "obtain" should read --contain--.

UNITED STATES PATENT AND TRADEMARK OFFICE
CERTIFICATE OF CORRECTION

PATENT NO. : 4,581,619  
DATED : April 8, 1986  
INVENTOR(S) : ATSUSHI MIZUTOME, ET AL.

It is certified that error appears in the above-identified patent and that said Letters Patent is hereby corrected as shown below:

COLUMN 10

Line 2, "11" should read --1--.

Signed and Sealed this

Tenth Day of November, 1987

Attest:

DONALD J. QUIGG

Attesting Officer

Commissioner of Patents and Trademarks